United States Patent [19]

Barnard

[11] Patent Number: 5,299,947

[45] Date of Patent: Apr. 5, 1994

[54] UTILITY RACEWAY

[75] Inventor: Rachael Barnard, 129 Silver Springs Rd., Bailey, Colo. 80421

[73] Assignee: Rachael Barnard, Bailey, Colo.

[21] Appl. No.: 511,353

[22] Filed: Apr. 18, 1990

[51] Int. Cl.$^5$ .............................................. H01R 25/00
[52] U.S. Cl. .................................. 439/215; 439/207
[58] Field of Search ........................... 439/207–211, 439/215

[56] References Cited

U.S. PATENT DOCUMENTS

| | | | |
|---|---|---|---|
| 1,718,252 | 6/1929 | Putnam | 439/209 |
| 1,718,253 | 6/1929 | Putnam | 439/209 |
| 3,821,688 | 6/1974 | Larsile | 439/209 |
| 4,135,775 | 1/1979 | Driscoll | 439/215 |
| 4,800,695 | 1/1989 | Menchetti | 439/215 |

OTHER PUBLICATIONS

Wiremold Catalog & Wiring Guide 28.
AT Power Systems Product Specifications & Installation Handbook.
EZ-Pole literature.
ISO-Duct literature.
Walker DP387PS Illustrated Price Scedule, Mar. 1987.
HKL Wireduct & Raceway Catalog.
Tyton Corp. Wiring Duct literature.
Circuit Trak literature.
Hubbell Power Poles literature.
Panduit literature.
NEPCO literature.
Mult-A-Serv literature.
English Electric "Duct System" literature.
Walkermold literature.
Easy Wire price sheet of Jun. 15, 1986.
Tehalit Electrical Raceway Systems Catalog '88/'89.

Primary Examiner—Gary F. Paumen

[57] ABSTRACT

A Utility Raceway for modular walls, fixed walls, and modular fixed or moveable partitions. The Utility Raceway is comprised of multiple compartments where electrical, data, and communication devices and device mounting brackets can be mounted on both sides of the raceway. The configuration of the Utility Raceway is I beam. Compartments can be added or deleted. Holecuts can be provided in the center structure of the I beam so that access can be made from one compartment to another. This will increase the capacity of said Utility Raceway making it easier for fiber optic cable to be used because of crucial bending requirements of said fiber optic cable. Said Utility Raceway can use existing manufacture's electrical, data and communication device mounting brackets and device plates. Said Utility Raceway can be metallic or non-metallic. It can use metallic or non-metallic electrical, data and communication device plates and mounting brackets or any combination thereof.

9 Claims, 14 Drawing Sheets

UTILITY RACEWAY

BACKGROUND OF THE INVENTION

The present invention relates to a novel and useful design for a communication, data, and electrical Utility Raceway. The Utility Raceway can be used as a structural member of a fixed or moveable wall or partition. The Utility Raceway has increased wiring capacity and increased flexibility allowing addition or deletion of data, communication, and electrical conductors and devices on both sides of said Utility Raceway. Other compartments of said Utility Raceway can be used for air handling, signal wiring, emergency wiring, gas or other utilities.

Raceways are not new concepts. A common Utility Raceway designed to accommodate said communication, data, and electrical devices and device mounting brackets on both sides of said raceway is new. Existing raceways are not designed to be used as a structural member that will support walls. Said Utility Raceway can be used as a structural member to support walls.

AT Power Systems, Tehalit, Easy WireBowers, Walker, Nepco, The Wiremold Co., Midland Ross, Isoduct, Hubbell, Dual-Lite and Panduit all have raceway systems that will accommodate electrical power, data, and communication. These raceway systems are not designed for mounting electrical, data and communication devices and device mounting brackets on both sides of said raceway systems, and they are not designed for use as structural support.

HKL, Tyton Corporation, and Circuit Trak all have non-meatlic raceway systems that are designed for low voltage communication and data or other non-UL listed low potential conductors. None are designed for power, 300 V to ground. None have the ability to mount devices and device mounting brackets on the front and back of said raceway systems. None can be used as a structural support for modular or fixed walls and partitions.

Although there are raceway systems that are designed to accommodate electrical power, communication conductors, data conductors and devices none can be used for structural support of a fixed or moveable partition or wall. None are designed to access both sides of said raceway systems. None are designed to be the structural top of a moveable or fixed wall or partition for use with lighting equipment as well as communication, data and power. None have a cover that is designed for use in dividing compartments. None have designed a cover that will reduce the electro magnetic interference—EMI—and radio frequency interference—RFI—to an acceptable level. None have designed raceways for use with fiber optic cable.

The present invention shows a Utility Raceway that has sweep elbows that will allow ease of fiber optic cable to make vertical or horizontal turns. The present invention has the ability of addition and deletion of electrical power, communication and data device plates and brackets for mounting of devices on both sides of the raceway. Holecuts can be provided in the center I beam structure that will allow both sides of the raceway to be used for fiber optic, data, power and communication conductors. Thus, making the sweep radius larger for ease of use with fiber optic conductors and connection of coaxial conductors to their devices. Tee and crossover connections, using the present invention's barriers in conjunction with said holecuts in the I beam structure, will allow greater ease of crossing power and low potential conductors. This will allow greater ease in radius sweeps for fiber optic and coaxial conductors. The present invention may use metallic or non-metallic dividers separating the compartments. Metallic dividers in said Utility Raceway or in a metallic cover can help reduce the electro magnetic interference—EMI—and radio frequency interference—RFI.

SUMMARY OF THE INVENTION

In accordance with the present invention a novel and useful Utility Raceway to provide ease of installation of electric power, communication, data, signal, lighting, and other utilities for use in new construction or renovation of existing facilities is provided.

The existing state of the art provide raceways that allow the installation of communication, data, power and signal conductors and their device plates, mounting brackets and devices only on one side of the raceway. The existing state of the art does not provide raceways that can be used as a structural member of a moveable or fixed partition or wall. They do not provide EMI and RFI protection. They do not provide easy installation of fiber optic conductors. They do not allow use of said raceways at the top of a moveable or fixed partition or wall for exit of data, communication, power and lighting conductors from both sides of said raceway.

The Utility Raceway is the only raceway designed that allows the flexibility of exit of communication, data, signal, power and lighting from both sides of the raceway. Said Utility Raceway is the only raceway designed to be used at the top or bottom of a fixed or moveable wall or partition or on both ends of said wall or partition.

The present invention is a complete modular wiring system. The Utility Raceway can be used to provide ease of distribution of power, data, communication, signal, lighting, air handling systems and other utilities needed for operating of todays high tech industries, offices, commercial facilities, homes and retail establishments. The present invention is the only one designed for earthquakes when used with moveable partitions that will protect against possible disconnect of said partitions if said partitions fall over because of said earthquake. Thus, providing some protection against electrical shock or other damage due to said electrical shock. The present invention is the only Utility Raceway designed for use with moveable partitions that is also designed to allow use of non-armored electrical power cable. For example, cable that is not enclosed in metallic or non-metallic flex or EMT. This will allow more circuits to be installed in said raceway, and allow better access to those circuits. The present invention can also be used on work benches. When multiple work benches are end to end the Utility Raceway can be tied together using couplings. Wire clips, internal elbows, external elbows, cross fittings, tee fittings, LAN fittings and other devices commonly known in the art may be used with the present invention. The present invention may use other manufactures devices or devices designed specifically for said present invention. Said elbows, cross fitting, and tee fitting are used to route conductors.

It may be apparent that a novel and useful Utility Raceway not shown in the prior art is provided.

It is therefore an object of the present invention to provide a Utility Raceway that has access to both sides of said Utility Raceway for exit of communication, data, power, signal, air handling systems—such as compressed air, and lighting.

It is another object of the present invention to provide a structural component for moveable, or fixed walls, and partitions.

It is yet another object of the invention to provide some earthquake damage protection to the electrical components of moveable partitions.

It is still another object of the present invention to provide a Utility Raceway that may use existing manufactures electrical, data and communication device mounting brackets and plates.

It is also another object of the present invention to show use of metallic or non-metallic materials or any combination thereof for the construction of said invention.

It can be another object of the present invention to show the use of a two sided raceway at the top of a fixed or moveable walls and partitions for lighting, power, communication, signal, air handling systems and other utilities.

It can also be another object of the present invention to provide ease of installation of fiber optic conductors.

It can yet be another object of the present invention to help guard against EMI and RFI.

Various aspects of the present invention will evolve from the following detailed description which should be taken in conjunction with the above delineated drawings.

DESCRIPTION OF THE PREFERRED EMBODIMENTS

The following embodiments of the present invention should be understood and interpreted in accordance with the heretofore described drawings.

Figure 1:
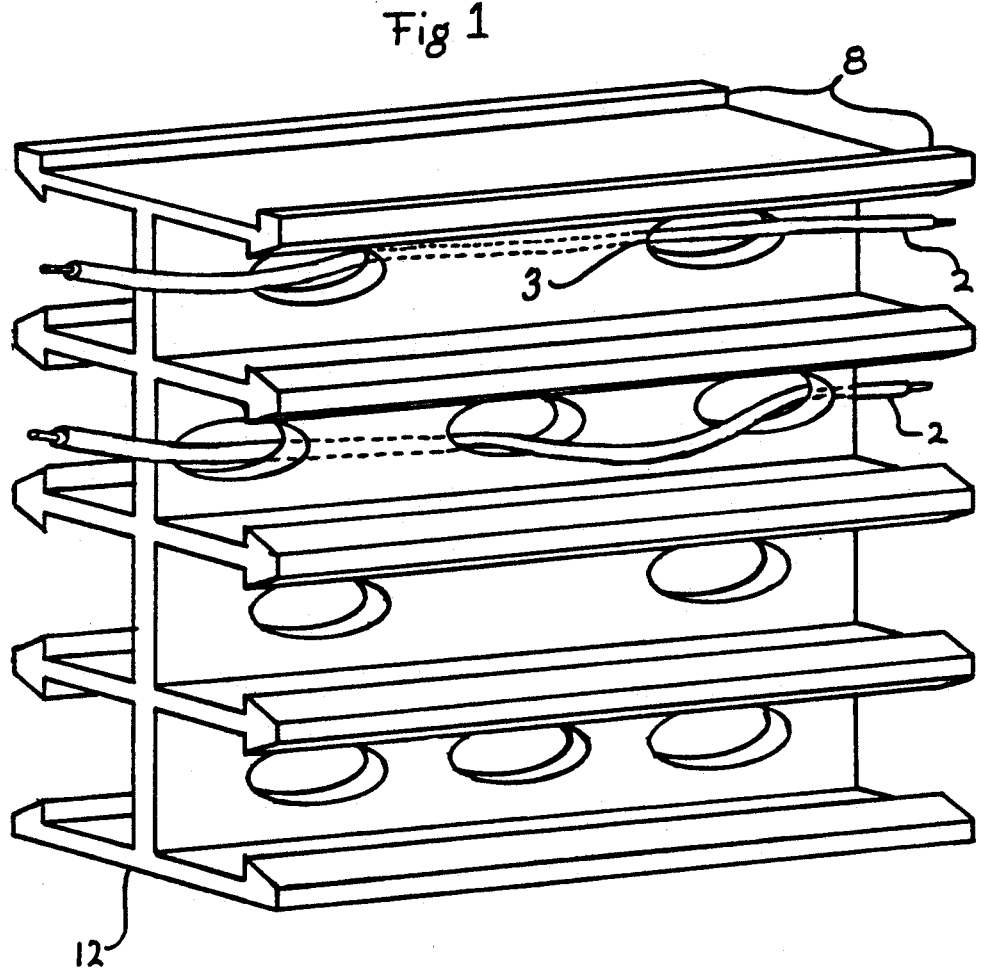
FIG. 1 depicts the overall simplicity and scheme of the present invention.
Figure 1:
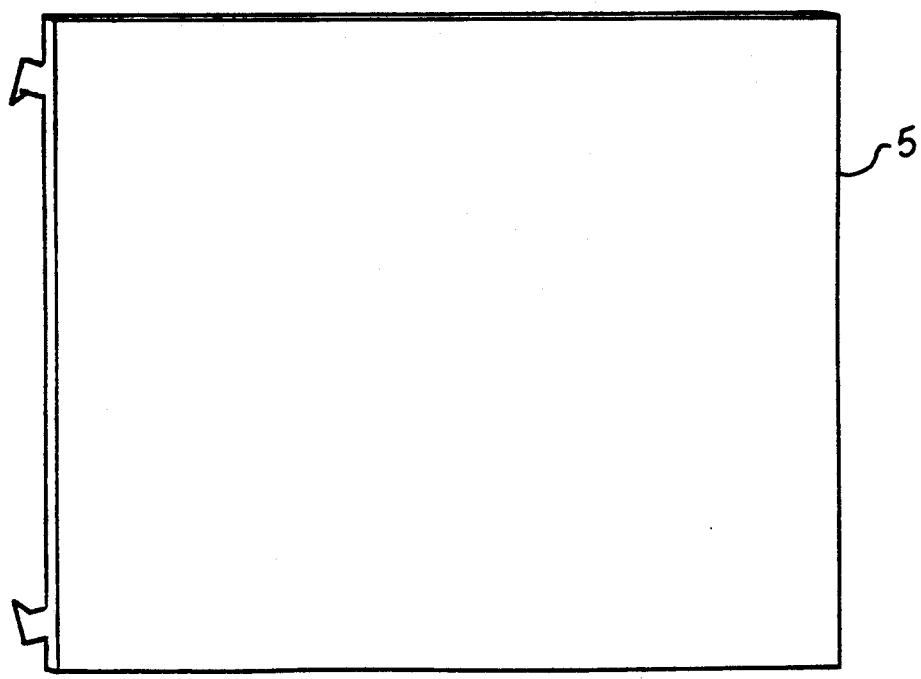
Figure 2:
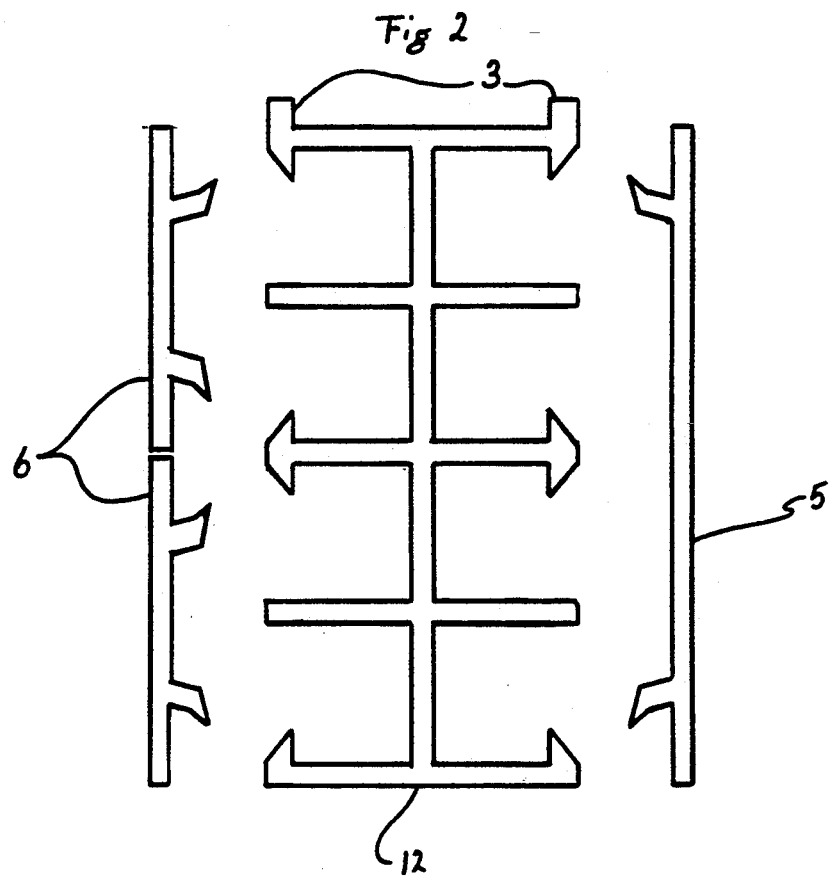
FIG. 2 is a end view showing the embodiment of the present invention.
Figure 3:
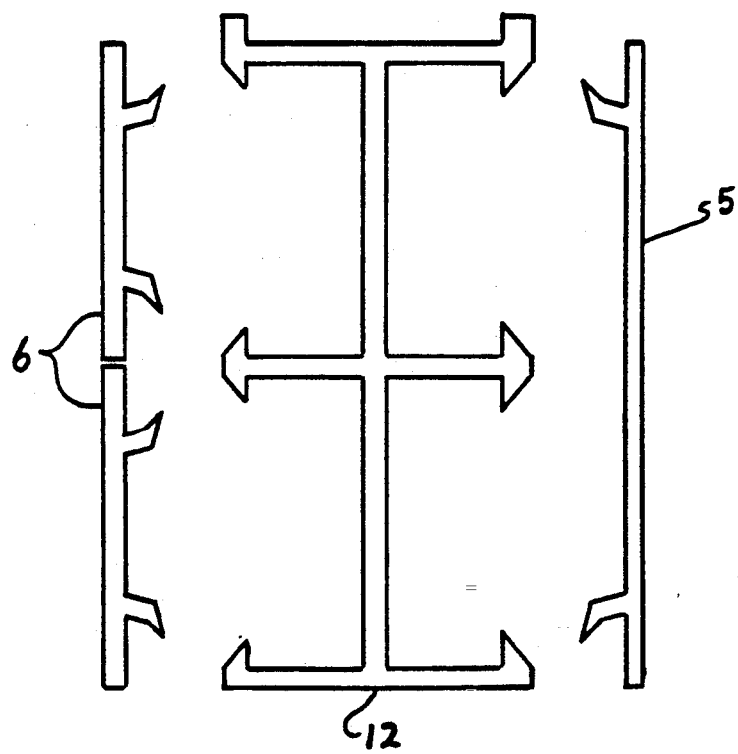
FIG. 3 is a end view showing another embodiment of the present invention.
Figure 4:
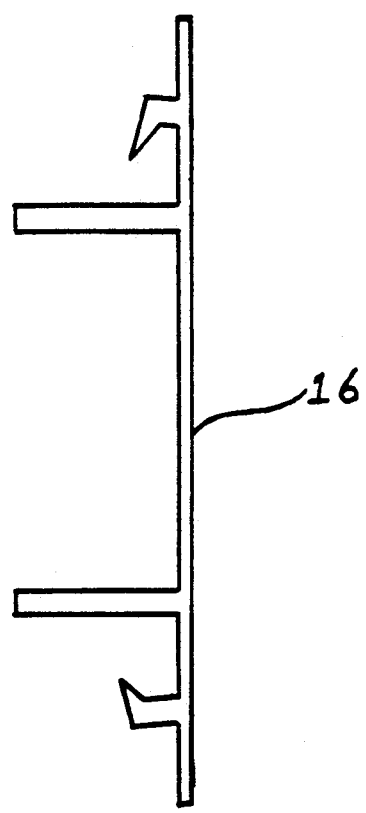
FIG. 4 is a end view showing a divided cover.
Figure 5:
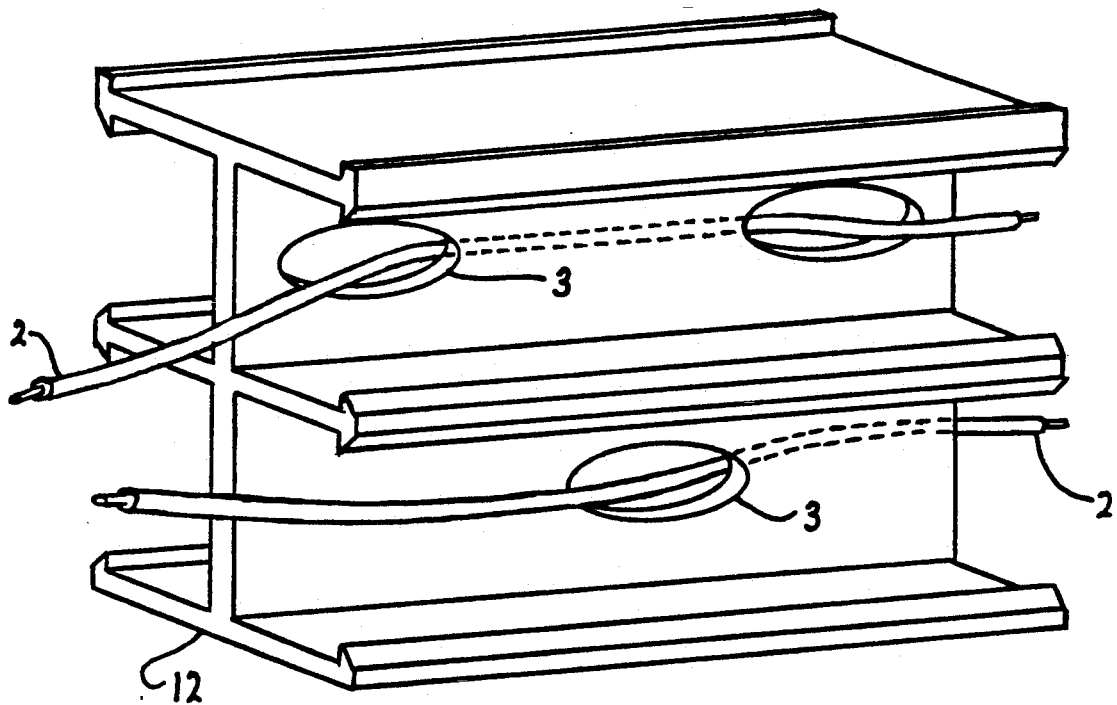
FIG. 5 depicts the preferred embodiment of the present invention.
Figure 5:
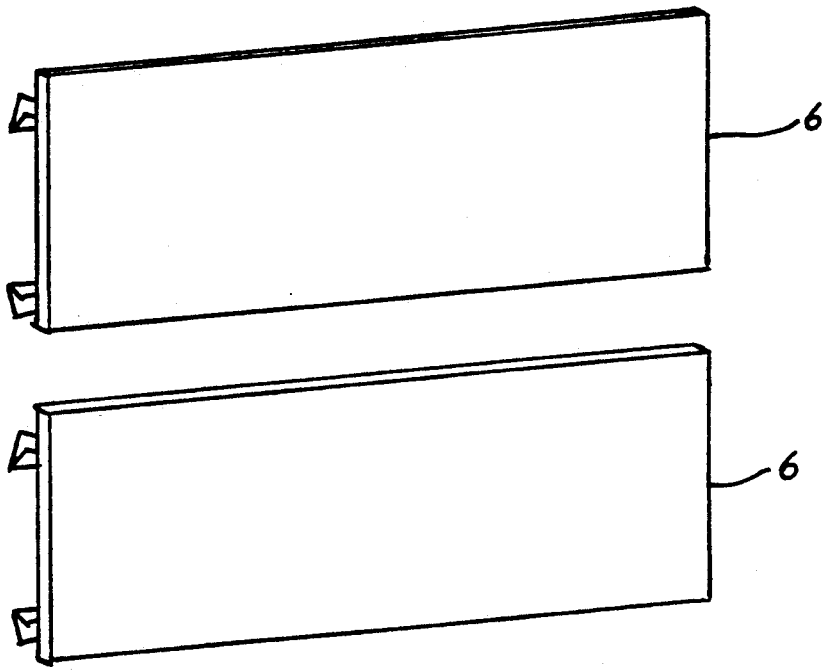

The invention as a whole is depicted by FIG. 1. FIG. 1 shows an eight compartment Utility raceway 12 that can be extruded metallic or non-metallic material. Holecuts 3 can be included in said Utility Raceway 12 allowing conductor means 2 to pass from one compartment to another. Flange means 8 can be used to hide rough cut edges of drywall or other materials commonly used in the construction industry for fixed or moveable walls and partitions. FIG. 2 shows an end view of the Utility Raceway 12, snap on cover 5, snap on covers 6 and flange means 8. FIG. 3 shows an end view of a four compartment Utility Raceway 12 with snap on cover means 6 and snap on cover means 5. Snap on cover means 5 and 6 can be metallic or non-metallic. A hinged cover may be substituted for Snap on cover means 5 and 6. Turning to FIG. 4 shows snap on cover means 16 with dual dividers that can divide the four compartment Utility Raceway means 12 shown in FIG. 5 into eight compartments.

Figure 6:
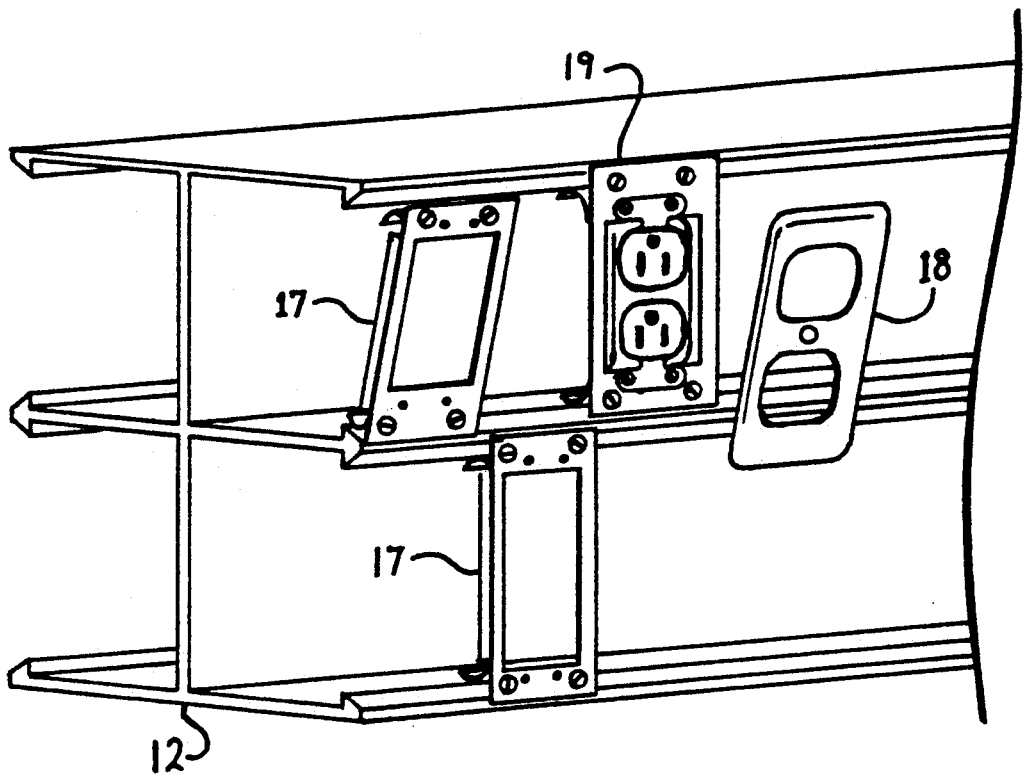
FIG. 6 shows a device mounting bracket, cover plate, and a electrical device.
Figure 7:
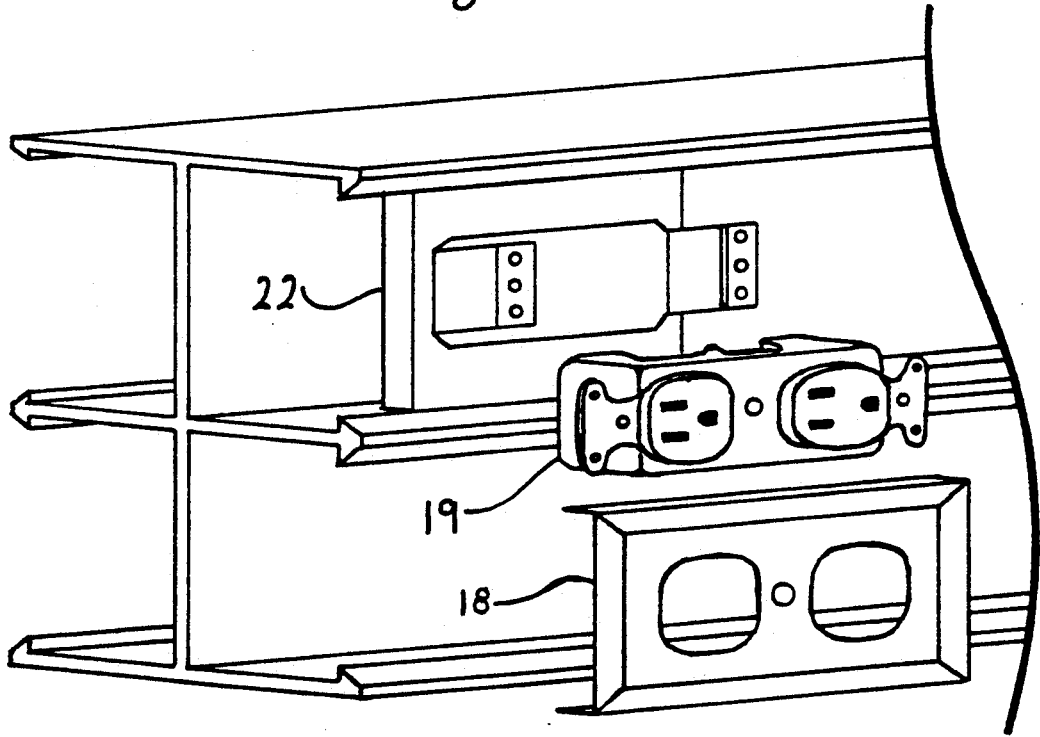
FIG. 7 depicts another method of mounting an electrical device.

FIG. 6 shows an electrical device mounting bracket 17 that can be installed in a compartment of Utility Raceway means 12. Electrical receptacle means 19 can be attached to electrical device mounting bracket 17 in the vertical position. Electrical device cover plate 18 can be attached to receptacle means 19. FIG. 7 shows an electrical device mounting bracket 22 installed in a compartment of Utility Raceway 12 in the horizontal position. Electrical Receptacle means 19 can be attached to electrical device mounting bracket 22 and electrical device plate 18 can be attached to electrical receptacle means 19. Cover means 6 can be cut the width of said electrical device plate 18 and butted up to electrical device plate 18 and snapped on.

Figure 8:
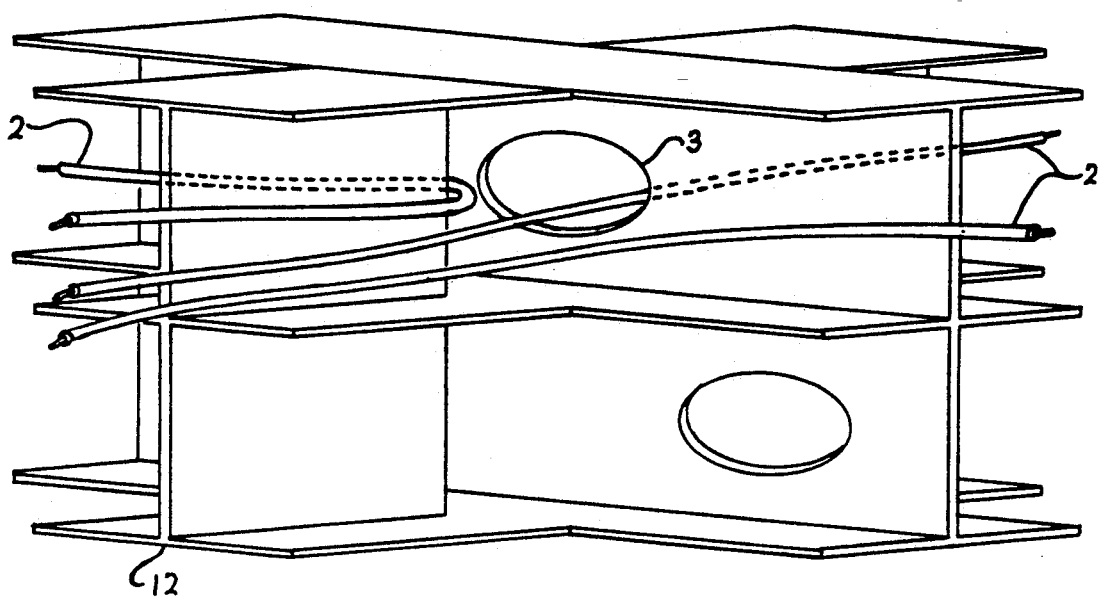
FIGS. 8 and 9 show horizontal tee connections.
Figure 9:
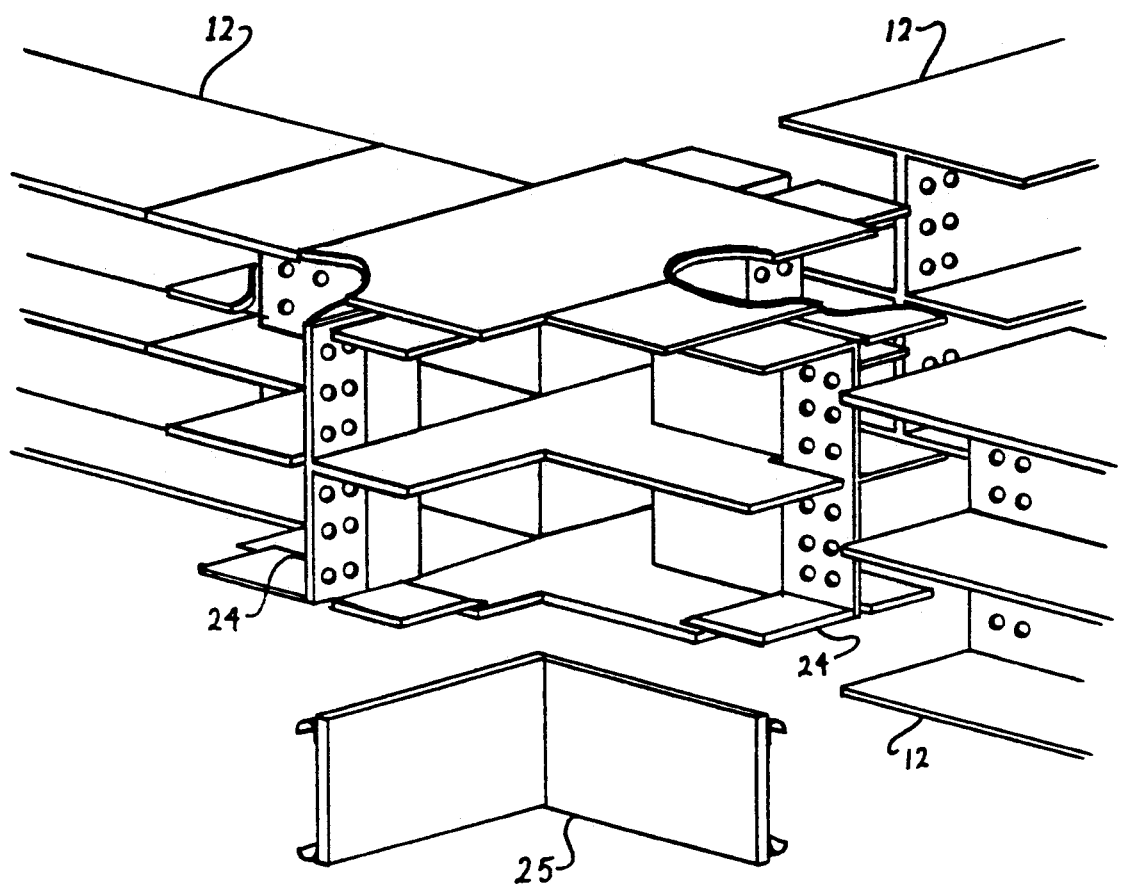

FIG. 8 shows a cross configuration of Utility Raceway means 12 used to route conductor means 2. Holecut 3 allows conductor 2 to pass through and continue in the same direction. Conductor means 2 are also shown turning to the right and left in the upper compartment of Utility Raceway 12. FIG. 9 shows the use of coupling means 24 and internal cover plate 25 commonly used in the current state of the art.

Figure 10:
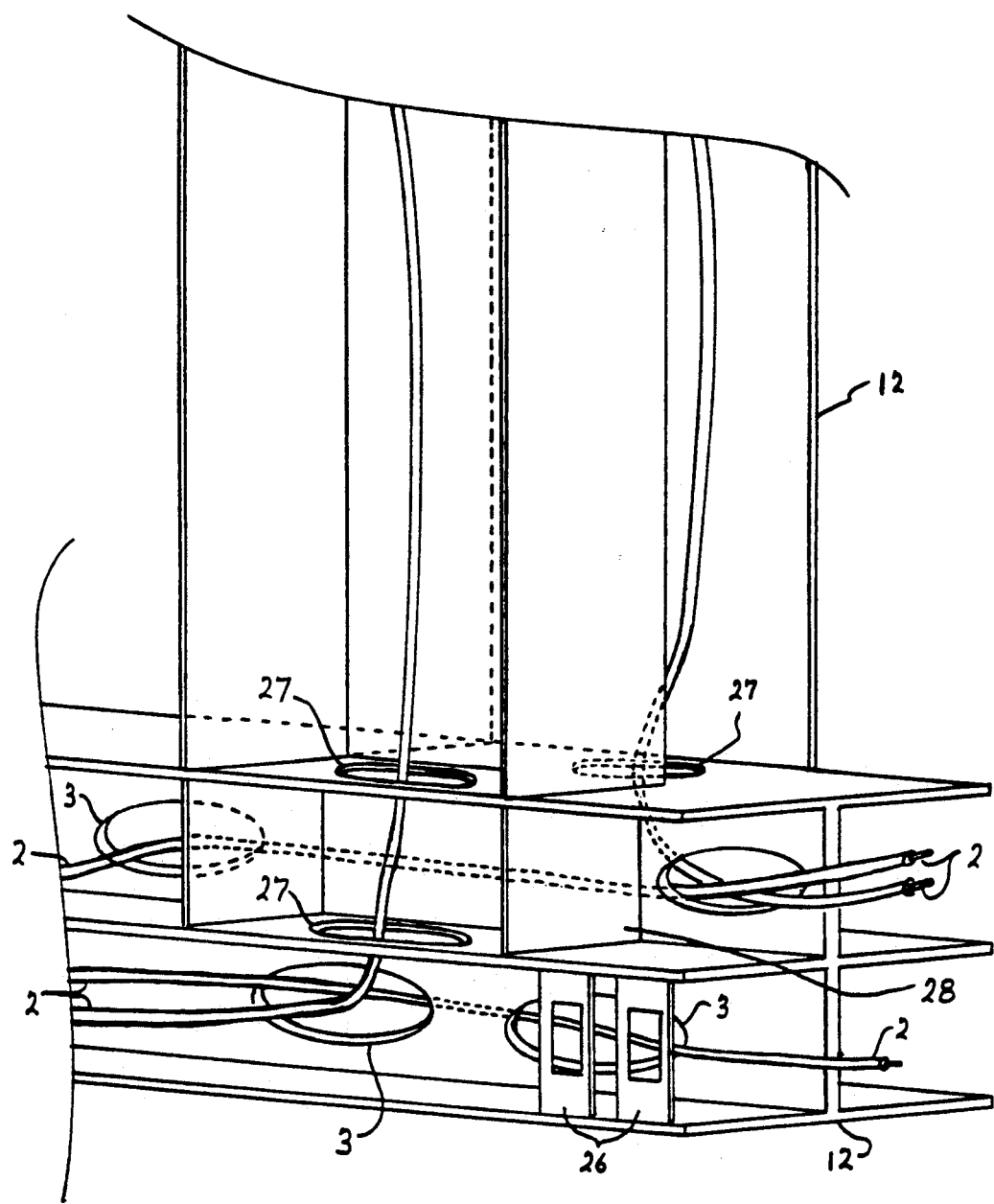
FIGS. 10 and 11 show vertical tee connections.

FIG. 10 shows a tee configuration to route said conductor means 2 and the ease in which low potential communication conductor means 2 in the bottom compartment of Utility Raceway 12 can pass through the upper compartment of Utility Raceway 12 that is dedicated to power. For example, 120/240 V single phase 3 wire electrical power. Holecut means 27 would be cut in the top of Utility Raceway 12 and barrier means 28 would be installed in the upper compartment of Utility Raceway 12. The communication conductor 2 in the lower compartment would then be passed through holecut means 27 into the communication compartment of the vertically mounted four compartment Utility Raceway 12. Because of holecut means 3, the power conductor 2 in the upper power compartment can be transferred from one side of Utility Raceway 12 through holecut 3 into the power compartment on the other side of Utility Raceway 12 and then back into the original power compartment. There wouldn't be any wiring capacity lost for the communication conductor means 2 because said communication conductor means 2, now vertical, would have used two compartments. Because two compartments are used the bending space is large enough to accommodate fiber optic cable. The other communication conductor 2 shown in FIG. 10 in the lower communication compartment could be used to connect to a communication device mounted in communication device plate 26. Fiber optic conductor means could be used for said communication conductor 2 and would pass through holecut 3 in the lower compartment into the other side of Utility Raceway 12 that would be dedicated to communications. Another communication device plate 26 could be mounted directly in front of another holecut 3 in the front compartment. When said fiber optic conductor, used for communication conductor 2, is brought back through said holecut 3, directly behind said communication device plate 26, into its original compartment, another communication connection could be made to device plate 26. Because said fiber optic conductor is using both bottom compartments to make its bend there would be ample bending space allowing said fiber optic conductor means to be used more easily. The concept of passing through the holecut means 3, for power or communication conductor means 2, doubles the wiring capacity because two compartments are being used allowing for larger bending radiuses. Both sides of Utility Raceway 12 can be used for mounting device mounting brackets and plates for both communication and power. Communication device plate 26 could be mounted on the opposite side of Utility Raceway 12 in the bottom compartment dedicated to communications. The communication device plate 26 would be mounted directly in front of one of the holecuts 3. The communication conductor 2 could then be brought through holecut 3 and attached to communication device plate 26 directly in front of holecut 3 in the back bottom compartment.

Figure 11:
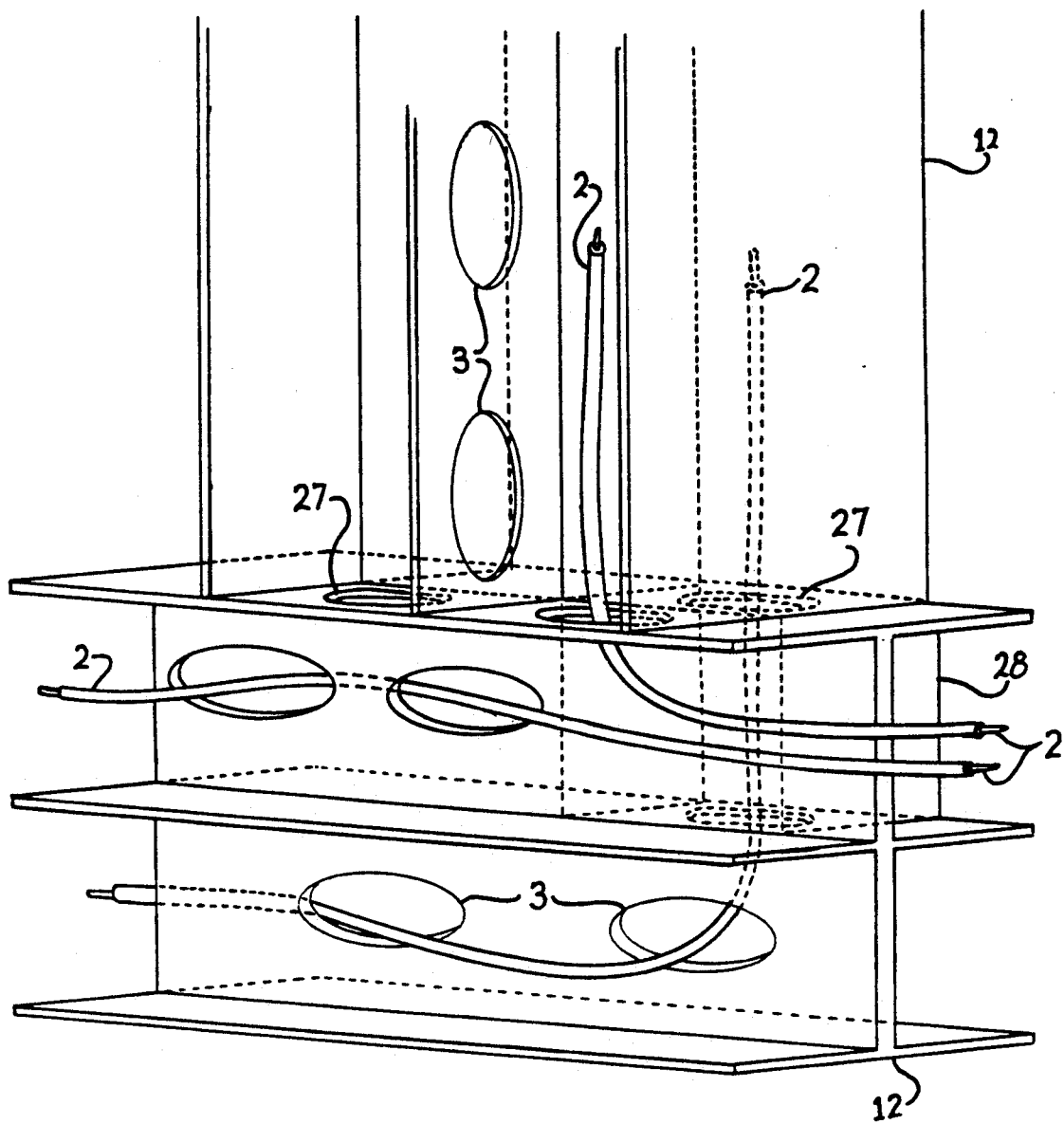

Turn to FIG. 11. The tee configuration used to route said conductor means 2. It shows the vertically mounted Utility Raceway 12 compartments facing front and back. On the vertically mounted Utility Raceway 12, for purposes of illustration, the front two compartments will be dedicated to power and the back two compartments to communication. The two bottom compartments of the horizontal Utility Raceway 12 will be dedicated to communications and the top two are power. Communication conductor 2 is brought through holecut 3 into the back communication compartment and then up through holecuts 27 through the back power compartment into the communication compartment of the vertically mounted Utility Raceway 12. Barriers 28 separate the communication conductor 2 from the power conductor 2 in the power compartment. One power conductor 2 in the upper power compartment of Horizontal Utility Raceway 12 is shown going through holecut 3 into the back bottom compartment and then through another holecut 3 into it's original compartment. Electrical connections can be made on either side of the raceway using that power conductor 2. Another power cable 2 is shown going from the front top power compartment through holecut 27 into the front right power compartment of the vertically mounted Utility Raceway 12. If that power conductor 2 was continued it could be brought through one of the holecuts 3 shown on the vertically mounted Utility Raceway 12. This would supply power for electrical connections in both front power compartments. The flexibility of Utility Raceway 12 is such that several other combinations of electrical and communication connections and conductor 2 directions could be used. Use and direction would depend on the application and need. For example, data conductor means 2 could be used in the same compartments as the communication conductor means 2 or the communication compartment could be dedicated to data conductor means 2. A multitude of variations and application can be adapted to the present invention. The bottom compartments in the horizontal Utility Raceway 12 in FIG. 11 could be dedicated to power instead of communication. The front two compartments in the vertical Utility Raceway 12 could be dedicated to communication, etc.

Figure 12:
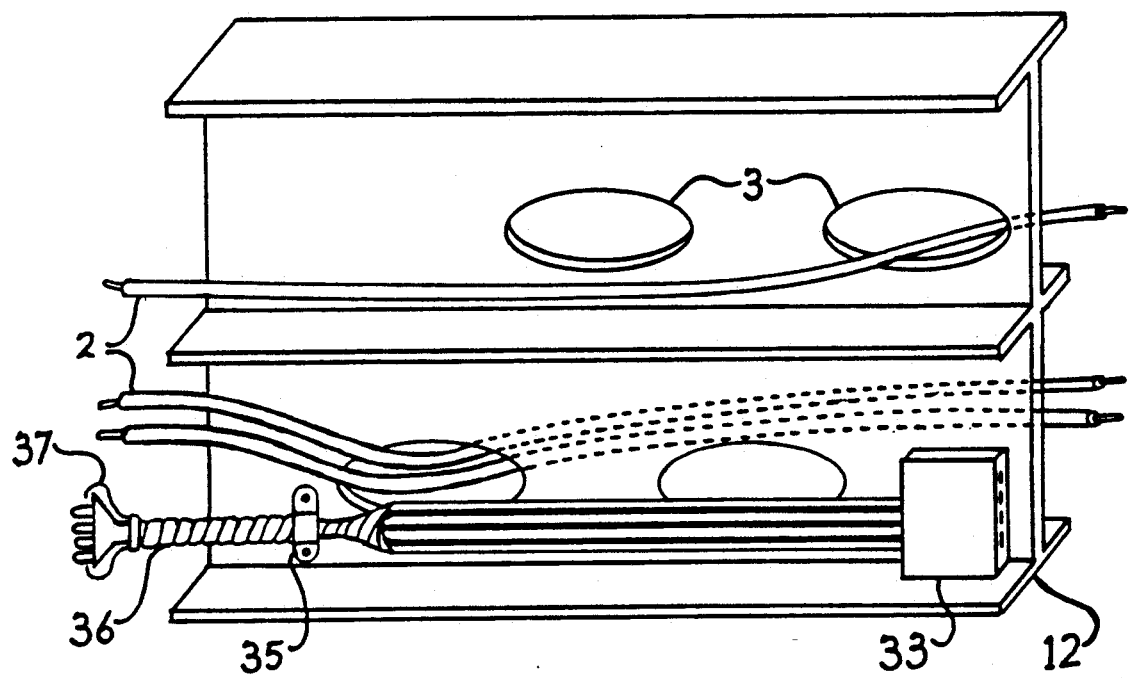
FIGS. 12, 13, and 14 show power application.

FIG. 12 shows an electrical female receptacle 33 in a lower power compartment of Utility Raceway 12. Attached to the electrical female receptacle 33 are power conductor means 2 that extends the full length of the said Utility Raceway 12. A piece of flexible conduit 36 encloses power conductor means 2 and is attached to Utility Raceway 12 by attachment means 35 commonly known in the industry. At the end of said flexible conduit 35 is an electrical male plugcap 37. This configuration will allow several Utility Raceways 12 to be plugged together electrically if the electrical male plugcap 37 is plugged into the female electrical receptacle 33 of another Utility Raceway 12. The Utility Raceways 12 could be connected together with coupling means commonly know in the art. FIG. 12 also shows additional power conductor means 2 in the bottom back power compartment of said Utility Raceway 12. The power conductors are going through holecut 3 into the front bottom power compartment. The two top compartments of said Utility Raceway 12 can be dedicated to power or communication. If holecuts 3 were not in the top power compartment then the top front compartment could be dedicated to power and the back top compartment could be dedicated to communication, or they could be reversed. If the front top compartment was dedicated to power then there would be three power compartments and only one communication compartment. Many other configurations of compartmental use can be adapted to the present invention.

Figure 13:
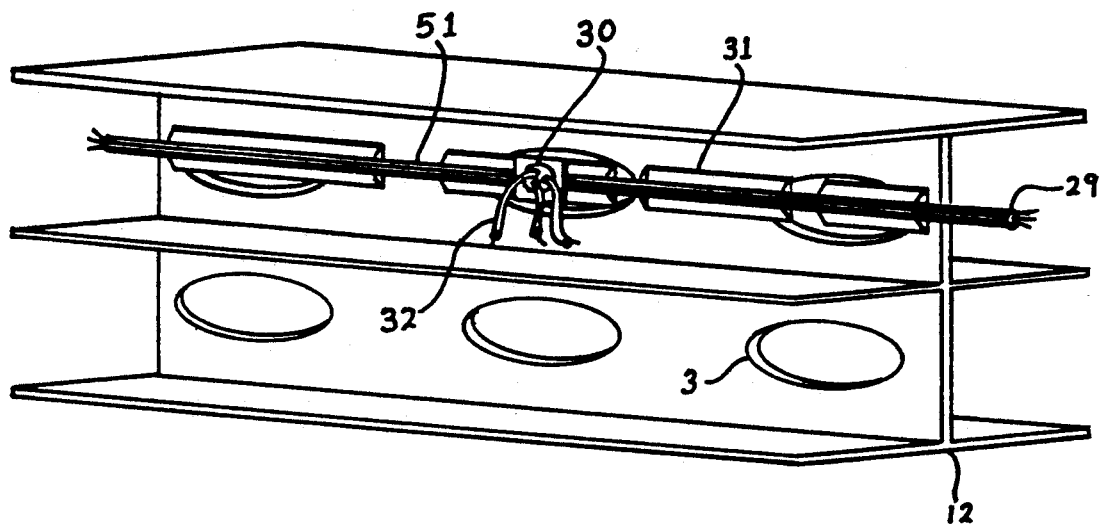

FIG. 13 shows use of Utility Raceway 12 with flat power cable 29 commonly known in the art. Two T extrusion means 31 hold said flat power cable 29 in said Utility Raceway 12. Opening means 51 in the T extrusion means 31 allow power tap 30, commonly know in the art, to attach to T extrusion means 31 and slid along said flat power cable 29. Power tap 30 can then be tightened to make an electrical connection to power cable means 30 to electrify the pigtails 32 of said power tap 30.

Figure 14:
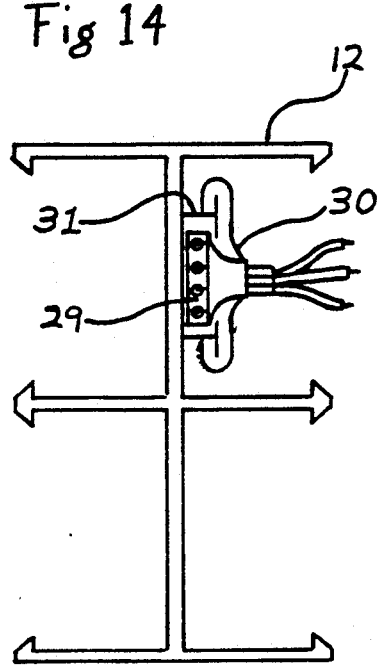

FIG. 14 shows an end view of Utility Raceway 12, flat power cable 29, and T extrusions 31.

Figure 15:
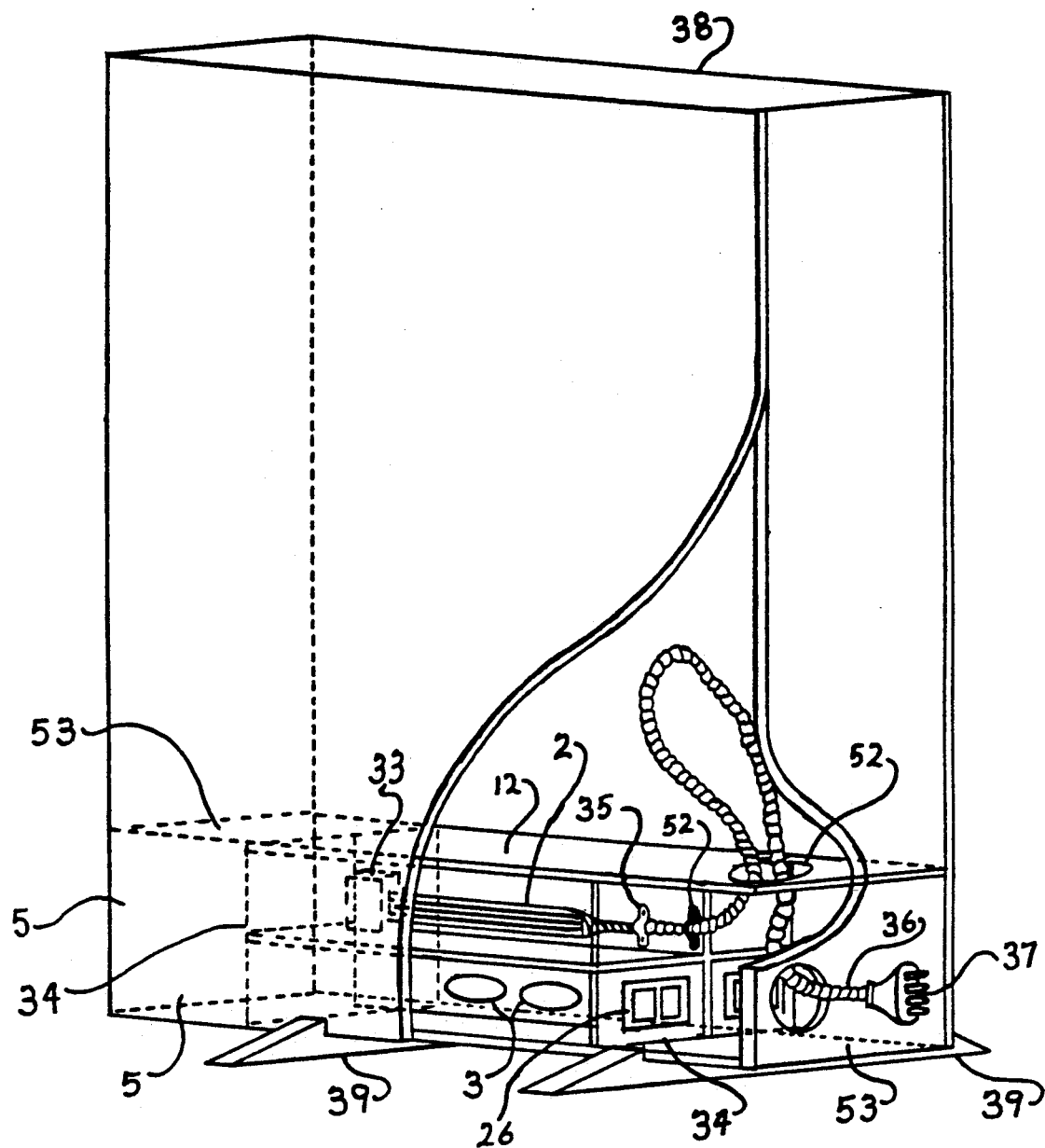
FIGS. 15 and 16 show application for use with partitions and walls.

FIG. 15 shows a moveable partition 38 that could be used to separate task areas in a open office landscape. At the bottom of the partition is Utility Raceway 12. Means 41 is used to anchor said partition to said Utility Raceway means 12. In this illustration the two top compartments of said Utility Raceway 12 are dedicated to electrical power. There is an electrical female receptacle 33 attached to electrical power cable means 2. Flexible conduit 36, enclosing electrical power conductor means 2, is attached to male plugcap 37. This configuration is similar to that shown on FIG. 12 with the exception that two end closure means 34 have been added to both ends of said Utility Raceway 12. A grommet hole 52 is provided in said end closure 34. Flexible conduit 36, enclosing electrical power conductor means 2, is brought through said grommet hole 52. It is then looped into partition 38. It can then extend out of partition 38 through blank space 53 of partition 38. This configuration will allow several Utility Raceway means 12, anchored to said partition means 38, to be tied together electrically. Male plugcap 37 in one partition can be plugged into the female receptacle means 33 of another partition 38. If, in the event of an earthquake balance support means 39 doesn't keep partition 38 in the upright position and said partition 38 falls over said flexible conduit 36 is designed to be pulled downward through blank space 53 allowing the electrical connection between two partitions 38 to be extended and remain intact. Male plugcap 37 may be prevented from disconnecting from female receptacle 33. The flexible conduit means can be metallic or non-metallic.

Power conductor means 2 extending out the end of Flexible conduit means 36 could be in the form of pigtails instead of running the full length of Utility Raceway 12 and attaching directly to plugcap 33. For example, six THHN 12 electrical conductors could be attached to plugcap 37, run through flexible conduit 36 and extend out 6 or more inches. This could provide 4 circuits of electrical power in Utility Raceway 12. Turning to the other end of Utility Raceway 12, electrical female receptacle means 33 could be attached to end closure means 34 and six THHN 12 pigtails could be attached and extended six or more inches into Utility Raceway means 12.

FIG. 15 shows snap on cover means 5 the full length of partition means 38. The Utility Raceway means 12 recessed, on both ends, into partition 38. End closure means 34 could also be used to close blank space 53. Utility Raceway 12 could also be extended the full length of partition means 38. Snap on cover means 5 could be replaced with snap on cover means 6 and snap on cover means 16. Many other configurations can be adapted to partition means 38 using Utility Raceway means 12. This would depend on application and need. Cover means may also be hinged.

Figure 16:
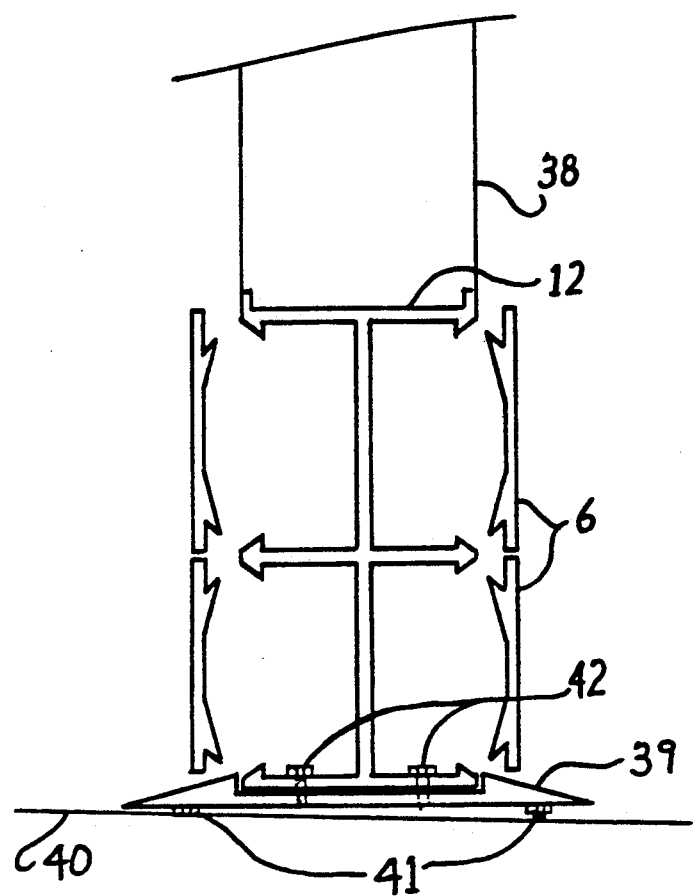

FIG. 16 shows an end view of partition means 38 and Utility Raceway means 12. Balance support means 39 could be attached to floor 40 by attachment means 41 that would anchor said balance support means 39 to said floor means 40. The anchoring method is commonly known in the state of the art. For example, bolts extended into concrete, screws into wood, etc. Utility Raceway means 12 could be secured to Balance support 39 using means 41.

Figure 17:
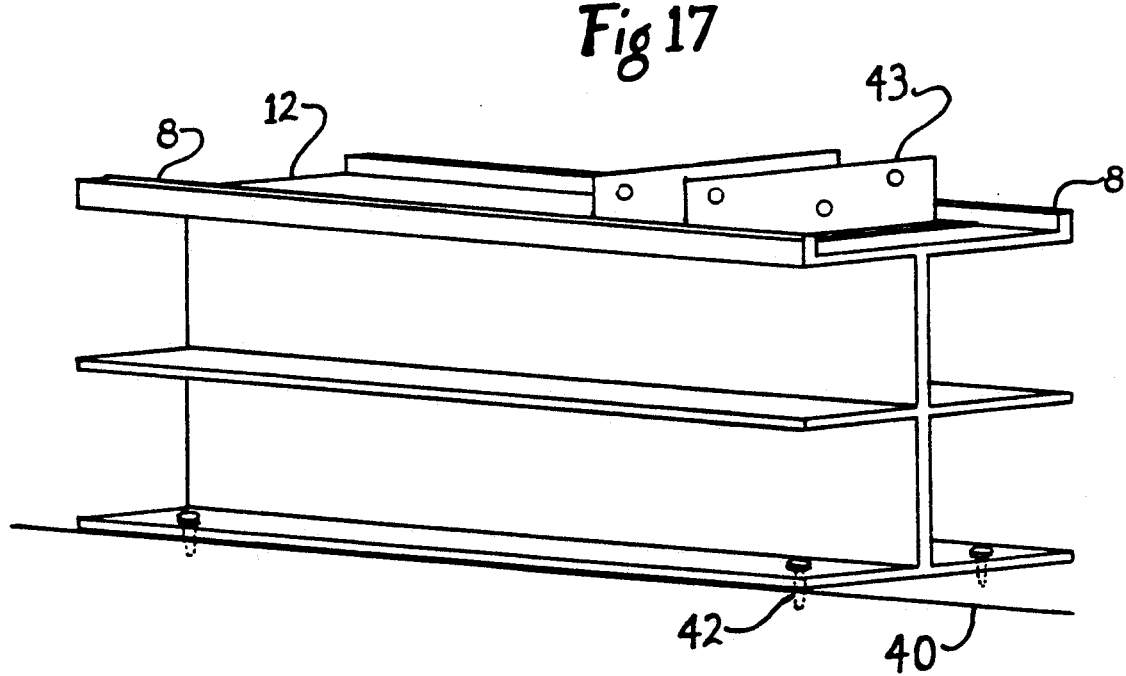
FIG. 17 depicts the overall embodiment of the present invention.
Figure 18:
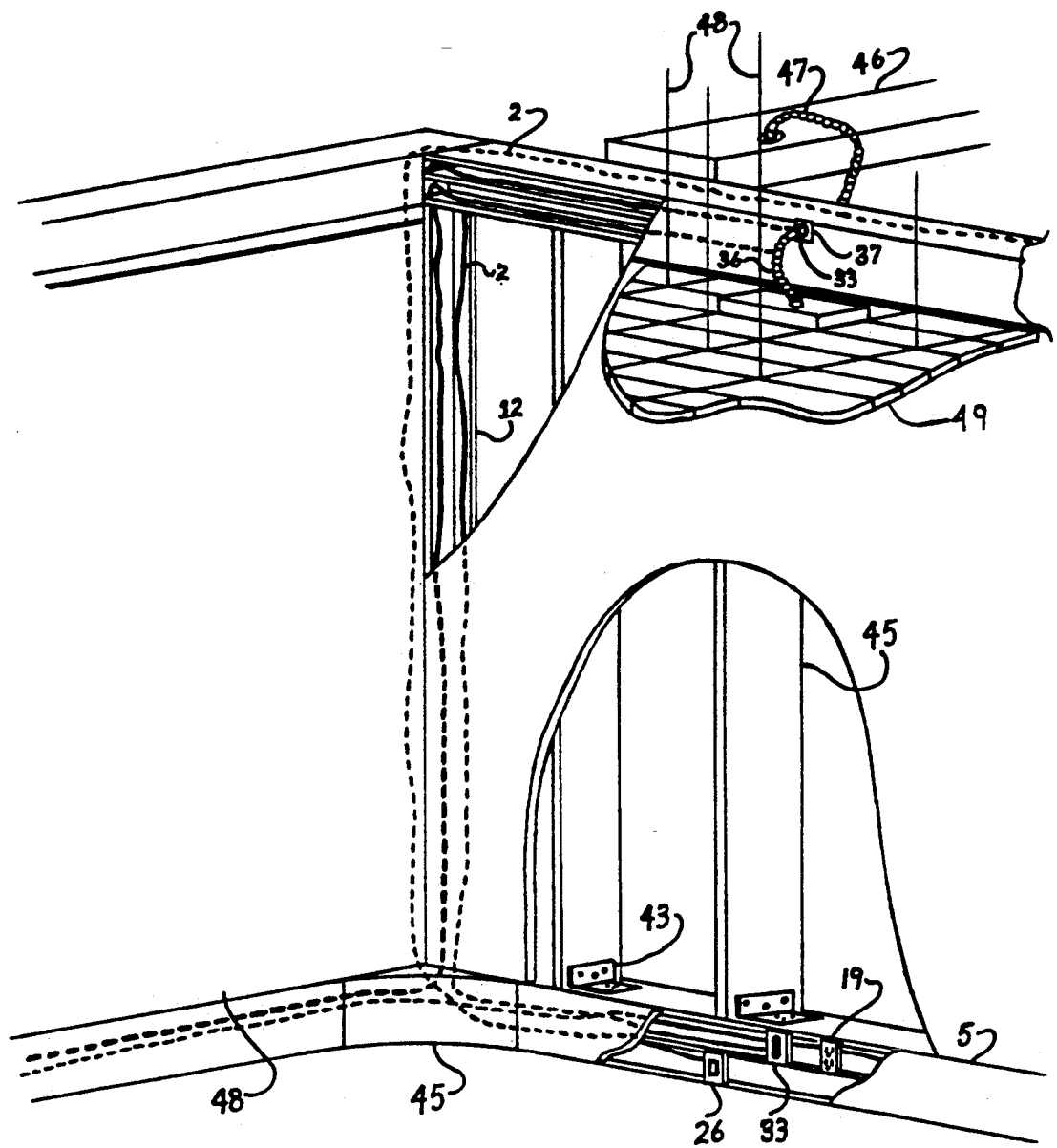
FIG. 18 depicts use of the present invention with a moveable partition.

FIG. 17 shows stud attachment means 43 that could support a metallic or non-metallic stud means 45 shown on FIG. 18 to Utility Raceway 12. FIG. 7 also shows flange means 8 that could be used with partition means 38 or in the application shown on FIG. 18. Utility Raceway means 12 can be attached to floor 40 using attachment means 41; however, attachment means 41 doesn't have to be used.

FIG. 18 shows what could be a typical application of Utility Raceway means 12. In this illustration wall 48 can be a factory assembled modular wall or the wall could have been built at the job site. The finish of wall 48 can be drywall or it could be a combination of other materials and might have a fabric finish. Stud means 45 attached to means 43 could be steel studs commonly used in the existing state of the art, or means 45 could be wood or any other substance used in the current state of the art.

Utility Raceway means 12 is shown as a perimeter raceway means attached to wall means 48. FIG. 18 represents a typical office environment with a dropped grid ceiling means 49. Grid ceiling means 49 is attached to the roof structure using means 48 known in the art. The area above ceiling means 49 could be a return air plenum. If the area above said ceiling means 49 is a return air plenum then all PVC conductors have to enclosed in a metallic enclosure such as EMT, raceways, flexible metal conduit, etc. because of instructions in the National Electrical Code (NEC). If the Utility Raceway 12 attached to wall 48 is manufactured from a metallic substance or other approved plenum material this would satisfy the NEC. A metallic flexible conduit 47 could then be attached to means 12 for exit of lighting conductors to fixture means 46. In this illustration the two top compartments of Utility Raceway 12, in the return air plenum, are dedicated to lighting and power conductors. The bottom two compartments, in said Utility Raceway 12, are dedicated to data and communications. Utility Raceway 12 shown in FIG. 18, at floor level, will have the two top compartments dedicated to power and the two bottom compartments dedicated to data and communications. Turn back to FIG. 11. If this concept of entry and exit of conductor means 2 is used then the communication, data, lighting and power conductor means 2 could easily be transferred from Utility Raceway 12 means in the return air plenum to Utility Raceway means 12 on the floor. Cable means 2 could easily be transferred from floor level to Utility Raceway means 12 in the return air plenum. Receptacle means 19 and communication or data means 26 are shown for use on both sides of Utility Raceway means 12. Means 43 is shown used with means 45.

Elbow sweep means 45 could be used to increase the depth of Utility Raceway means 12 at corners. It may be necessary to increase the bending radius space needed for use of fiber optic conductor means. It may not be necessary to use said sweep elbow 45 because the space provided in Utility Raceway 12 will probably be large enough to accommodate fiber optic conductor means.

Metal flexible conduit could also be used in the return air plenum for exit of communication, power and data from their assigned compartments.

Turn back to FIG. 15. If Utility Raceway 12 were extended the full length of partition 38 then said Utility Raceway 12 could be attached to Utility Raceway 12 shown on FIG. 18 using cross connections shown on FIGS. 8 and 9.

Again turn back to FIG. 15. If a female electrical receptacle 33 were attached to snap on cover 5, shown on Utility Raceway 12 on FIG. 18, then the electrical male plugcap 37, shown on FIG. 15, could be plugged into said female electrical receptacle 33 attached to said snap on cover 5, shown on FIG. 18. This would transfer electrical power from said Utility Raceway 12, shown on FIG. 18, to said Utility Raceway 12, shown on FIG. 15. If a communication or data device plate 26 were attached to end closure 34, shown on FIG. 15, then a double ended male communication or data conductor 2 could transfer communications or data from Utility Raceway 12, shown on FIG. 18 to Utility Raceway 12, shown on FIG. 15. This could be done by plugging one male end of the double ended communication or data conductor 2 into a female communication or data device attached to device plate 26, shown on FIG. 18. The other male end of the double ended communication or data conductor 2 could then be plugged into a female communication or data device attached to device plate 26 attached to said end closure 34 shown on FIG. 15.

Turn to FIG. 18. It shows flexible conduit means 36, containing lighting conductors 2 with male plug cap 37 attached to one end. If said lighting conductors 2 extended out the other end of said flexible conduit means 36 and attached to lighting fixture 46, and if a female receptacle means 33 were electrically connected to lighting conductor means 2 in Utility Raceway 12 means, shown in the return air plenum on FIG. 18, then said Male plug cap 37 could be plugged into said female receptacle 33 of said Utility Raceway 12 in the return air plenum and lighting fixture 46 would be electrically connected.

While in the foregoing specification, embodiments of the present invention have been set forth in considerable detail for the purposes of making a complete disclosure of the invention. It may be apparent to those of ordinary skill in the art that numerous changes may be made without departing from the spirit and principles of the invention.

What is claimed is:

1. A Utility raceway comprising
   a. compartment means for holding electrical power, data and communication conductor means;
   b. holecut means that allows said electrical power, data and communication conductor means to enter and exit said compartment means;
   c. bolt or screw means to anchor said Utility Raceway to floor means;
   d. flange means to cover rough cuts of drywall means;
   e. stud attachment means to support metallic or non-metallic stud means;
   f. sweep elbow means to increase bending radius space for said electrical power, data and communication conductor means.

2. The Utility Raceway of claim 1 in which dual snap on cover means are used to cover said compartment means of said Utility Raceway.

3. The Utility raceway of claim 1 in which hinged cover means are used to cover compartment means of said Utility Raceway.

4. The Utility Raceway of claim 1 in which a snap on cover means with dividers is used to cover compartment means of said Utility Raceway.

5. The Utility Raceway of claim 1 in which said Utility Raceway is used in a return air plenum.

6. The Utility Raceway of claim 1 in which said Utility Raceway includes wall means made from said metallic or non-metallic stud means and said drywall means.

7. The Utility Raceway of claim 1 in which said Utility Raceway includes partition means for separation of task areas.

8. The said Utility Raceway of claim 1 in which Utility Raceway includes a balance support means to hold said Utility Raceway that a partition means is attached to.

9. The Utility Raceway of claim 1 in which a flexible conduit means containing said electrical conductor means is looped into partition means so that in the event of an earthquake and said partition means falls over said flexible conduit means containing said electrical conductor means will slide and extend outward from said Utility Raceway preventing electrical disconnect from an electrical female receptacle means.

* * * * *